T. SANDSTROM.
SHORT TURNING GEAR MECHANISM.
APPLICATION FILED JUNE 24, 1920.
1,377,096.
Patented May 3, 1921.
3 SHEETS—SHEET 1.
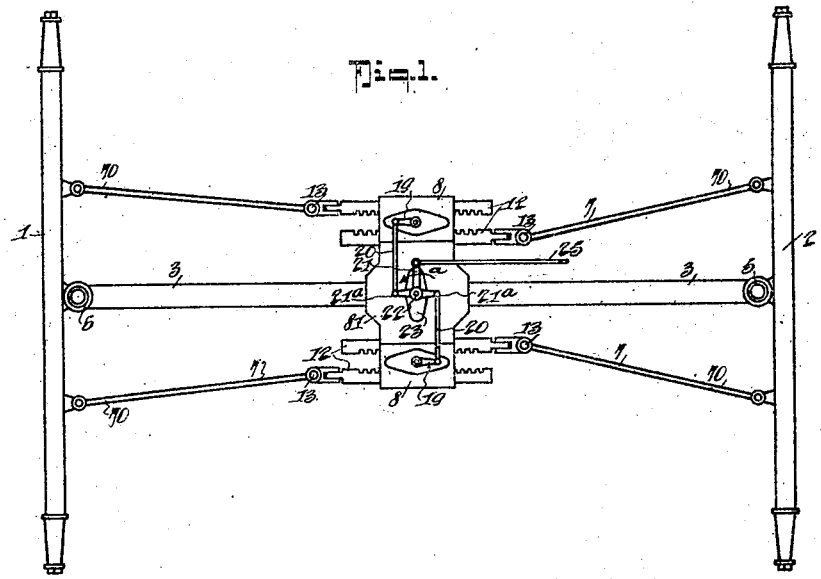
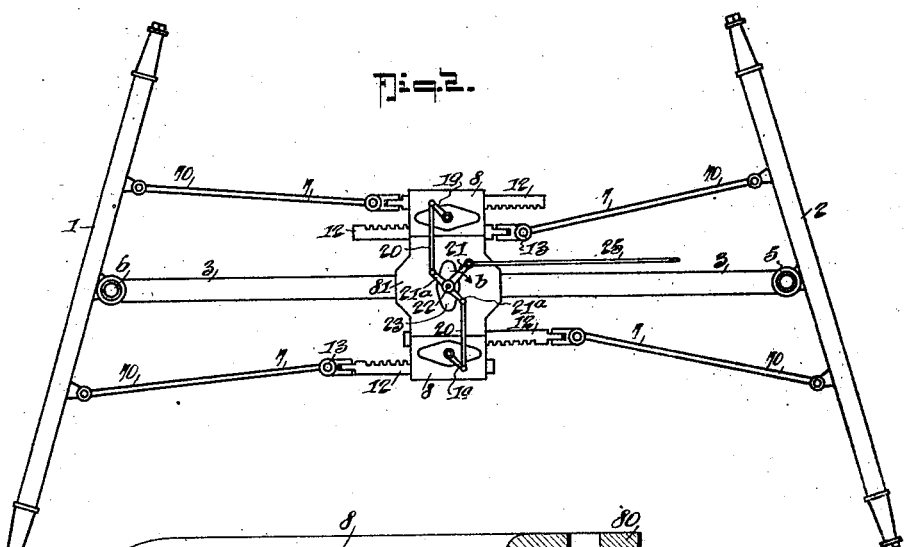
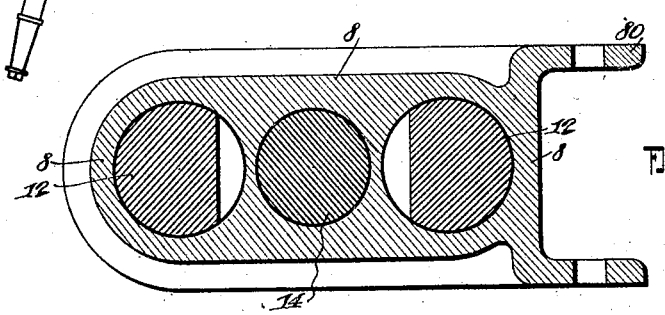
INVENTOR
Theodore Sandstrom.
BY
Fred G. Dieterich
ATTORNEYS

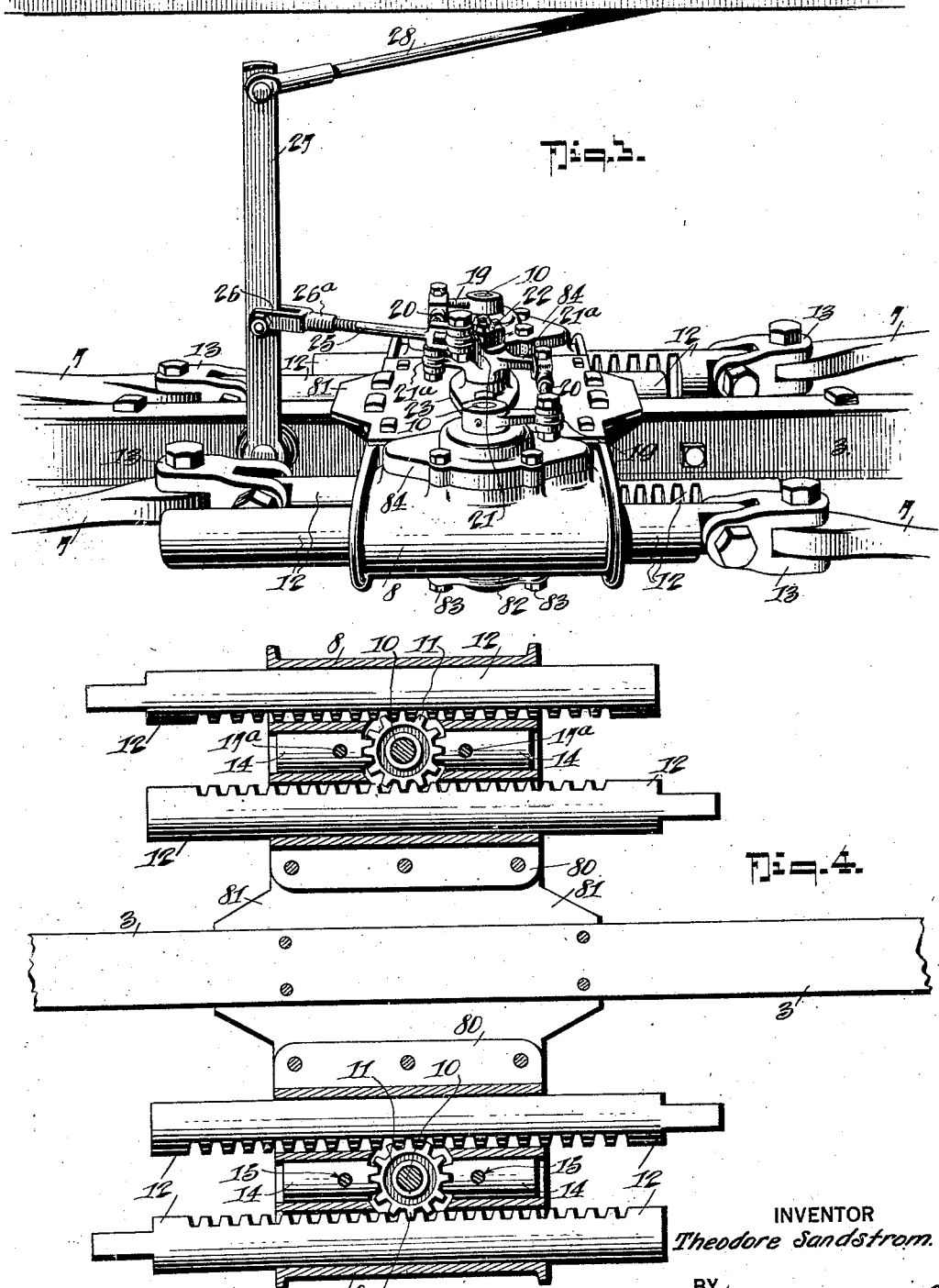

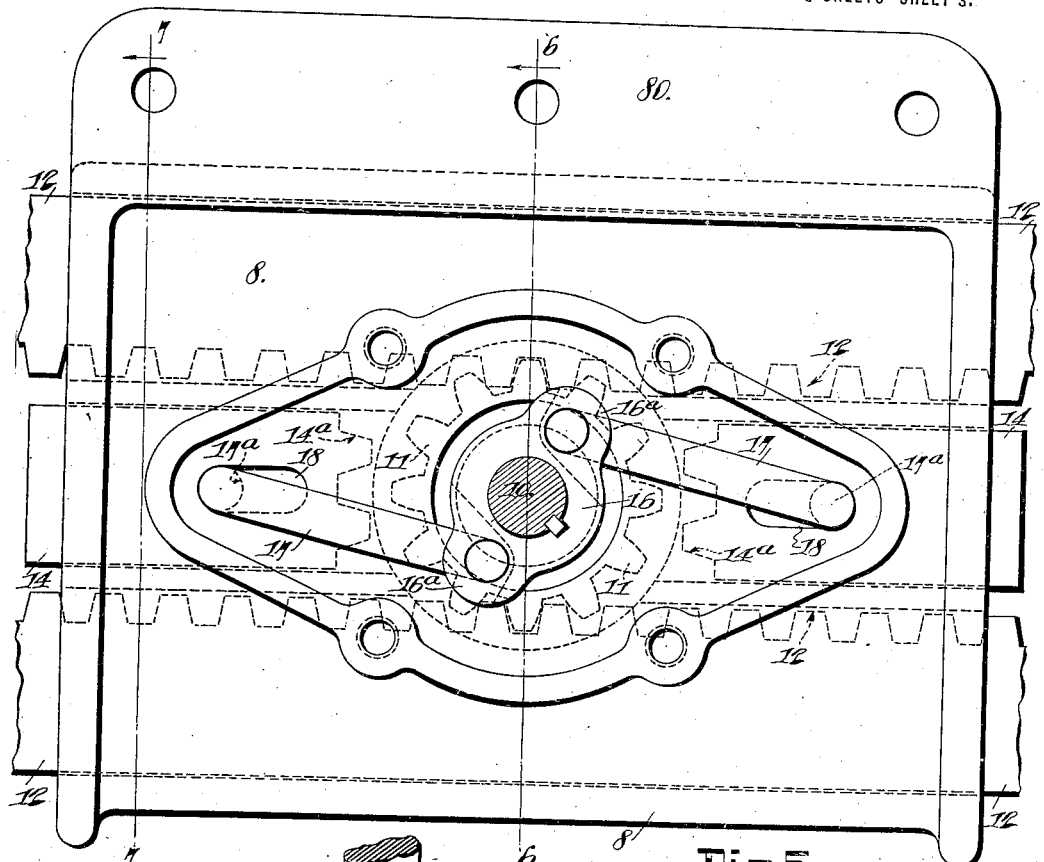

UNITED STATES PATENT OFFICE.

THEODORE SANDSTROM, OF CLEVELAND, OHIO.

SHORT-TURNING-GEAR MECHANISM.

1,377,096.　　　　　　Specification of Letters Patent.　　Patented May 3, 1921.

Application filed June 24, 1920. Serial No. 391,396.

*To all whom it may concern:*

Be it known that I, THEODORE SANDSTROM, a citizen of the United States, residing at Cleveland, in the county of Cuyahoga and State of Ohio, have invented a new and useful Short-Turning-Gear Mechanism, of which the following is a specification.

This invention generally relates to certain improvements in short turning gear mechanism for vehicles, particularly adapted for connection with motor trucks and trailers and is more specifically designed for use in connection with that type of short turn gear disclosed in Patent No. 1,186,338 granted to Carl E. Sandstrom and myself and dated June 6, 1916.

The short turning gear disclosed in the patent before mentioned generally embodies a pair of connecting rods that join the front and rear axles of the vehicle, which rods are each of an extensible and contractible nature and include a pinion and a pair of opposing rack members that engage the pinion and by which a draft forward on one member of the rod connection imparts a backward thrust on the other or coöperating member of such rod connection.

An esential feature of my present invention is embodied in an improved form of locking mechanism operable from the driver's seat on the tractor or other vehicle equipped with my improved short turn gear for locking the rack and pinion connections in a fixed relation, that is from shifting, to thereby maintain the wheels in rigid position with respect to each other, whether they be in straight alinement or on a circle and thereby provide for more positively and conveniently controlling the trailer in backing straight or on a circle.

Another and essential purpose of my present invention is to provide, in a short turn gear of the character stated, a simple, inexpensive and easily driver controlled means, whereby the operation of locking the wheels in their desired relative adjustments, straight ahead or on curves, and the application of the brake devices for the truck and trailer wheels may be effectively accomplished.

With further objects or purposes in view that will hereinafter be brought out, my invention consists in the peculiar features of construction and novel arrangement of parts, all of which will be hereinafter stated in the detailed description, specifically pointed out in the appended claims and illustrated in the accompanying drawings, in which:

Figure 1 is a diagrammatic plan view of my short turn gear, the front and rear axles being shown at parallel positions and the gear locking devices positioned at their normal or unlocked adjustment to permit of free movement of the short turning gear.

Fig. 2 is a view similar to Fig. 1, the axles and the gear coöperative therewith being shown at a turning position, the locking devices being at the locked position.

Fig. 3 is a perspective view of a portion of the reach bar with my improved construction of short turn gear devices mounted thereon, parts of the extensible and contractible connections that join the front and rear axles of the trailer being also shown.

Fig. 4 is a horizontal section of the parts shown in Fig. 3, the locking plungers being at their locked or pinion engaging position.

Fig. 5 is a plan view of one of the pinion and rack arm connections, the locking plunger that coöperates therewith and the toggle-like lever connections that join with the locking plunger and the lever controlled rocker member hereinafter referred to.

Fig. 6 is a cross section of the parts shown in Fig. 5, taken on the line 6—6 on Fig. 5.

Fig. 7 is a detail cross section on the line 7—7 on Fig. 5.

In my present construction of short turn gear, the front and rear axles 1 and 2 have centrally disposed means for pivotally connecting thereto the opposite ends of a reach bar 3, one end of which preferably has a ball coupling for engaging a socket 5 on the adjacent axle, and the other end has a clevis 6 for connection with the other axle.

In my present construction of short turn vehicle gear, a shiftable connection is also provided, one at each side of the reach bar, as in the patented construction referred to, and the said two connections are pivoted at their opposite or outer ends to the front and rear axles in the manner best shown in Figs. 1 and 2, by reference to which it will be observed that each connection, between the two axles, consists of two rods 7—7, the outer ends 70—70 of which join with their respective axles and the inner ends have a substantially telescopic relation and of such character that as the shiftable connection, at one side extends, when making a turn (see Fig. 2), the other shiftable connection correspondingly shortens.

As in the patented construction, rack and pinion devices are employed for connecting the inner or slidable ends of each pair of rods 7—7 that constitute the connection.

In the present construction, instead of connecting the opposing rack members 12—12 by threaded sockets and holding the racks 12 up to the pinions 11 by spring devices, as in the said patented construction, each of the rack members 12 is in the nature of a round bar that snugly fits and slides within a correspondingly shaped bore or passage in what I term a lock controlled box or housing 8, the construction of which and the bearings for the pinion 11 is best shown in Figs. 5 and 6.

By referring now to Figs. 3, 5 and 6, it will be noticed a separate housing or box 8 is provided for each pair of slidable rack members 12 and their coöperating pinion and each of such housings include upper and lower apertured flanges 80—80 which provide for conveniently bolting the housing at each side of the reach bar to upper and lower casing plates 81—81 attached to the said reach bar in the manner clearly shown in Figs. 3 and 4.

In the present construction of short turning gear, the pinions 11 are each loosely mounted on a short vertical shaft 10 in turn mounted in their respective housing sections, as is best shown in Fig. 6, from which it will be observed the pinion 11 is held within its housing by a bottom cap 82 that is secured by four bolts 83 which pass through the housing cap, and a supplemental housing or top cap 84, the purpose of which will presently appear.

By mounting each pinion and its respective rack bars in a box or housing structure, as shown and described, the racks and the pinions will always be held in proper operative relation and from binding and to provide for the direct or parallel longitudinal shifting movements of the several rack bars, when making a turn, the outer ends of the several bars 12, each have a double pivotal joint connection 13 with their respective bars 7—7, as is clearly shown in Fig. 3.

As before noted, one of the essential features of my present invention is embodied in a means, operable from the driver's seat, for locking the rack and pinion devices for each of the axle connections from movement, when the axles are either in parallel adjustment for straight ahead travel of the vehicle or when the said axles and their wheels are set for making a turn.

One of the lock devices is shown somewhat in detail in Figs. 5 and 6, from which it will be seen a pair of oppositely disposed locking plungers 14—14 are slidably mounted in suitable longitudinal guide ways between the rack faces of each opposing pair of rack members 12—12 and each plunger 14 has a toothed inner edge 14$^a$ which is, at desired times, brought into mesh with the pinion 11, the two plungers being linked to move together and for locking with their engaged pinion, at diametrically opposite sides thereof, the link connections being constructed as follows:

Keyed upon each of the pinion shafts 10 is a horizontal rocker 16 provided with diametrically oppositely extended apertured ears 16$^a$.

17—17 denote a pair of link rods, one of which is pivotally connected to each of the ears 16$^a$. The outer end of each of the rods 17 has a pendent member 17$^a$ which has a limited free movement through a longitudinal slot 18 in the casing 8 and fits loosely into an aperture 15 in its coöperative plunger 14 and which, at times, as presently explained, shift the said plungers 14—14 into and out of locked engagement with the pinion 11.

The rocker 16, before referred to, and the links 17—17 are held from exposure and practically dust-proof within the supplemental housing on the top of the main housing into which the pinion 11 is held as is apparent with reference to Figs. 5 and 6.

The upper end of each pinion carrying shaft 10 extends above the supplemental housing and to the said upper end of each shaft 10 is pinned a crank 19 and the two cranks 19—19 are attached to the two shafts 10—10 at opposite sides of the reach bar and are joined, by link rods 20—20 with the opposite ends 21$^a$—21$^a$ of a rocker lever 21 that is loosely journaled on a vertical stud shaft 22 on a casting 23 bolted to the top of the casing plate 81, as is clearly shown in Fig. 3.

The rocker lever 21 connects with a crank arm 25 that extends laterally from the lever proper and whose outer end is threaded for connection with a threaded socket 26$^a$ on a coupling 26 that pivotally joins with an upright lever 27 that is fulcrumed at its lower end onto the reach bar and whose upper end pivotally joins with a locking rod 28 which, in practice, extends forwardly in suitable guides (not shown) to the driver's seat, it being obvious that by pulling or pushing the rod 28, the lever 27 is swung to actuate the several crank lever connections that join with the pinion carrying shafts 10, thereby to turn the rockers 16, it being obvious that motion imparted to the rocker 16 in the direction of the arrow $a$, shifts the locked plungers 14 to the pinion released position and, when turned in the opposite direction (see arrow $b$), the plungers are moved into engagement with the pinion and hold it and the rack members coöperating therewith, in rigid relation.

From the foregoing description taken in connection with the drawings, the complete operation of my improved short turn gear, the manner in which it operates and its advantages will be apparent to those skilled in the art to which my invention relates.

The short turn gear devices automatically operate to effect the desired simultaneous reverse adjustments for turning of the front and rear axles and no matter whether the axles be in parallel or on a turn, the driver can instantly, through the lever mechanism described and shown, shift the locking device to lock the telescopic connections 7—7 that join the two axles and render each as a solid member and cause them to act as rigid rod connections between the two axles.

While the details of construction shown and described present a practical and effective means for accomplishing the desired results, it is understood that they are susceptible of changes to suit the particular character of vehicles for which my short turn gear may be provided without going beyond the scope of the appended claims.

What I claim is:

1. In a short turning vehicle gear in which is included front and rear axle structures; a pair of connecting rods joined at their opposite ends to the opposite axles, racks on the said rods, fixed guides in which said racks move, pinions connecting adjacent racks and a lock device for each pinion to hold such pinions and their respectively engaged racks rigid.

2. In a short turning vehicle gear in which is included front and rear axle structures; a pair of connecting rods joined at their opposite ends to the opposite axles, racks on the said rods, fixed guides in which said racks move, pinions connecting adjacent racks, a lock device for each pinion to hold such pinions and their respectively engaged racks rigid, and lever controlled means for shifting the said lock devices into and out of connection with their respectively engaged pinions.

3. In a short turning vehicle gear in which is included front and rear axle structures, a pair of connecting rods joined at their opposite ends to the opposite axles, racks on the said rods, fixed guides in which said racks move, pinions connecting adjacent racks, a lock device for each pinion to hold such pinions and their respectively engaged racks rigid, and lever controlled means for shifting the said lock devices into and out of connection with their respectively engaged pinions, the said means including a rocker mounted on each pinion shaft, a slidable plunger having a toothed portion for meshing with the pinion, a crank, and a link connection that joins the crank and the plunger.

4. In a short turning vehicle gear in which is included front and rear axle structures; a pair of connecting rods joined at their opposite ends to the opposite axles, racks on the said rods, fixed guides in which said racks move, pinions connecting adjacent racks, a lock device for each pinion to hold such pinions and their respectively engaged racks rigid, and lever controlled means for shifting the said lock devices into and out of connection with their respectively engaged pinions, the said means including a rocker mounted on each pinion shaft, a slidable plunger having a toothed portion for meshing with the pinion, a crank, and a link connection that joins the crank and the plunger, and other crank and link connections that join the actuating lever and the rockers on the two pinion shafts, whereby to operate the opposite locking plungers in unison.

5. In a short turn vehicle gear, front and rear axle structures, a connection to which the axles are pivoted, a housing mounted on each side of the connection, each housing having a pair of oppositely disposed semi-circular guideways, a half round bar slidable in each guideway, each of the said bars having a rack face, the said faces opposing, a pinion mounted in each housing and meshing with said opposing rack faces, a pair of oppositely extended link members pivotally joined with the pair of rack bars and with the front and rear axles at their respective sides of the axle connection, the said housings each including an upper fixed bearing and a lower removable bearing for its respective pinion.

6. In a short turning gear, the combination with the front and rear axles, a reach bar pivotally joined at its opposite ends to the two axles, a connection at each side of the reach bar that join the two axles, each of the said connections including a housing secured to and projected laterally from the reach bar, a pair of oppositely slidable rack bars, guides in the housing for the said bars, a pinion in each housing that coengages two racks, oppositely extended link arms pivotally connected with the rack bars and with their respective front and rear axles, a pair of oppositely disposed lock dogs for interlocking with each pinion, and a lever controlled means for simultaneously shifting both sets of lock dogs into and out of mesh with their respective pinions.

7. In a short turning vehicle gear of the character described and in which is included a pair of connections that pivotally join with the front and rear vehicle axles, each of the said connections comprising a pair of opposing and oppositely shiftable rack members and a pinion engaging the rack members and so arranged whereby as one of said connections is extended, while turning, the other connection is likewise contracted and lever actuated means for locking the rack and pinion devices in rigid relation, at times.

8. In a short turning gear in which is included a pair of oppositely disposed automatically telescopic connections arranged whereby as one connection shortens, the other lengthens while turning, means including lever controlled devices for locking the said telescopic connections in rigid relation.

THEODORE SANDSTROM.